Sept. 9, 1952     O. H. WENNLUND     2,610,035
MILK COOLER
Filed April 15, 1949     3 Sheets-Sheet 1
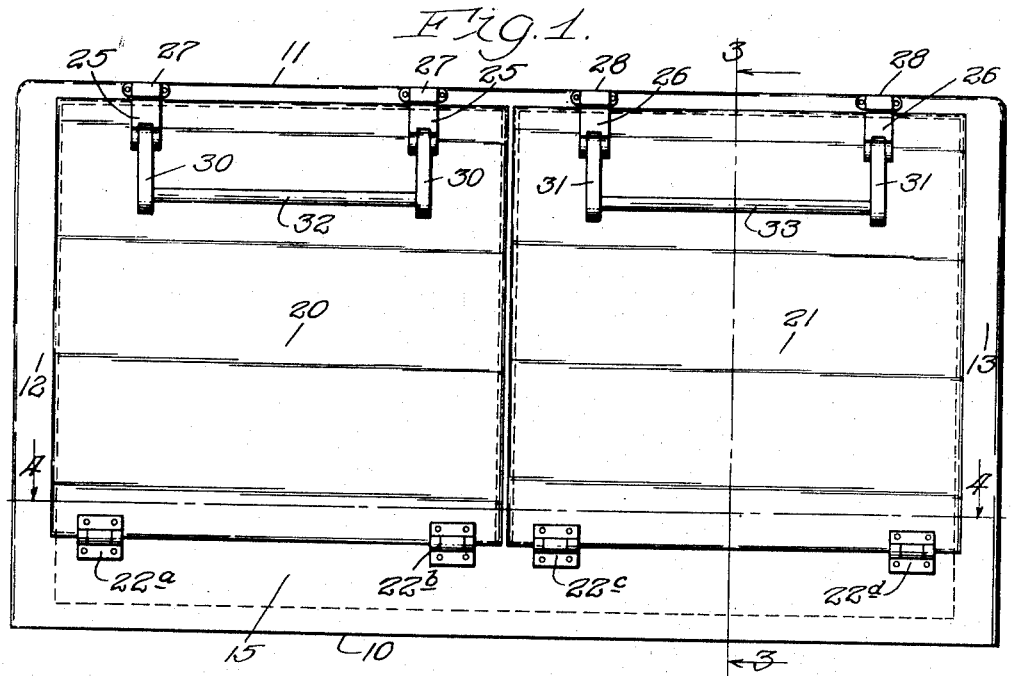
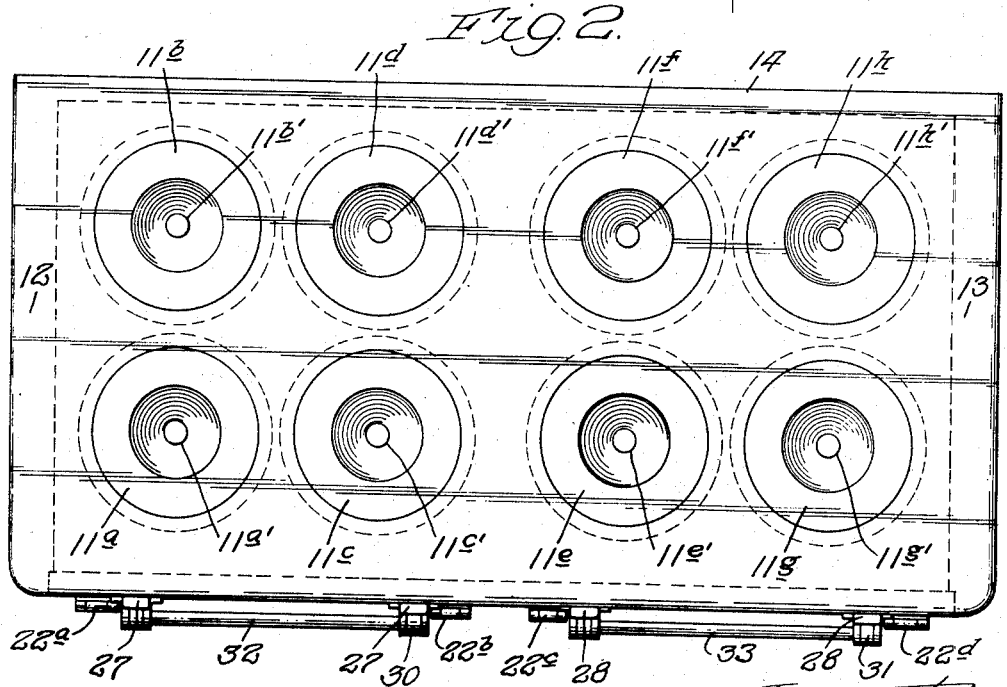
Inventor:
Otto H. Wennlund

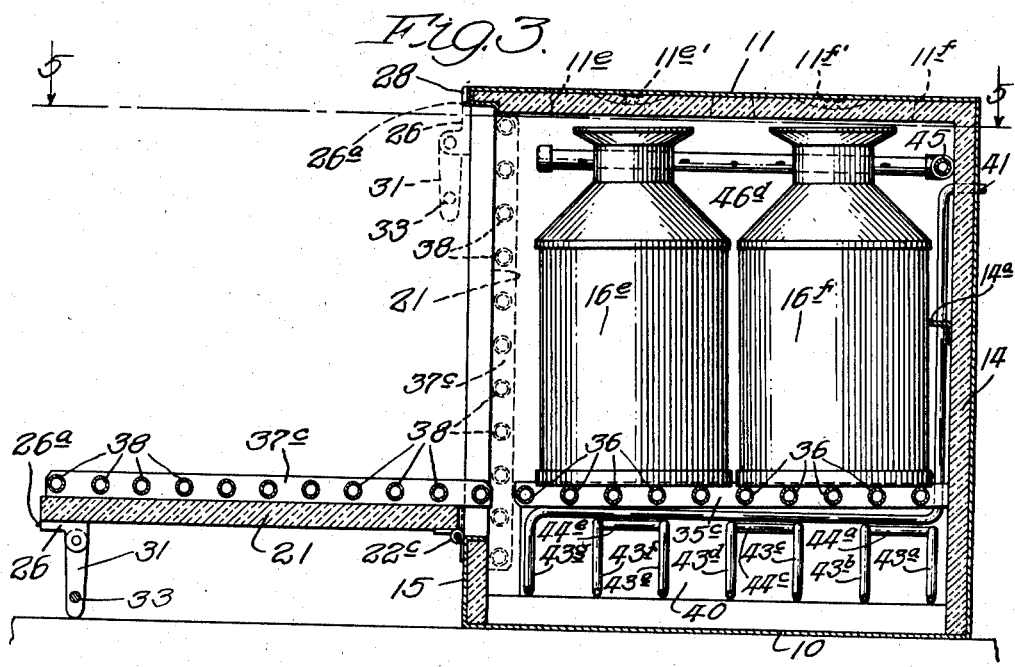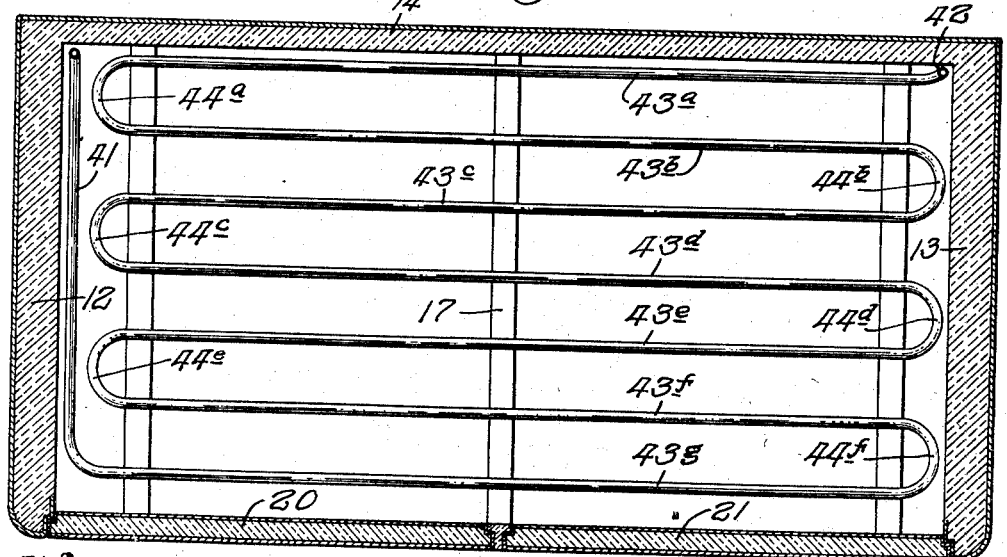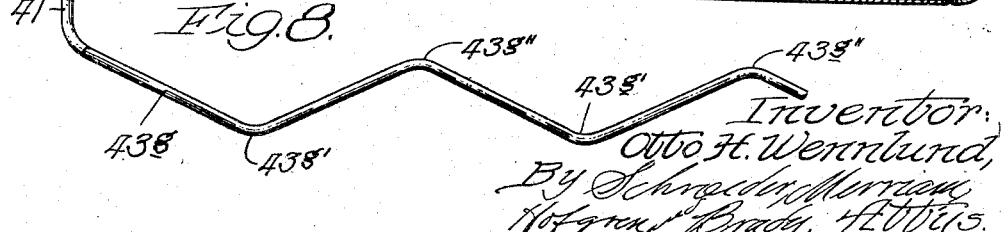

Sept. 9, 1952 O. H. WENNLUND 2,610,035
MILK COOLER
Filed April 15, 1949 3 Sheets-Sheet 3
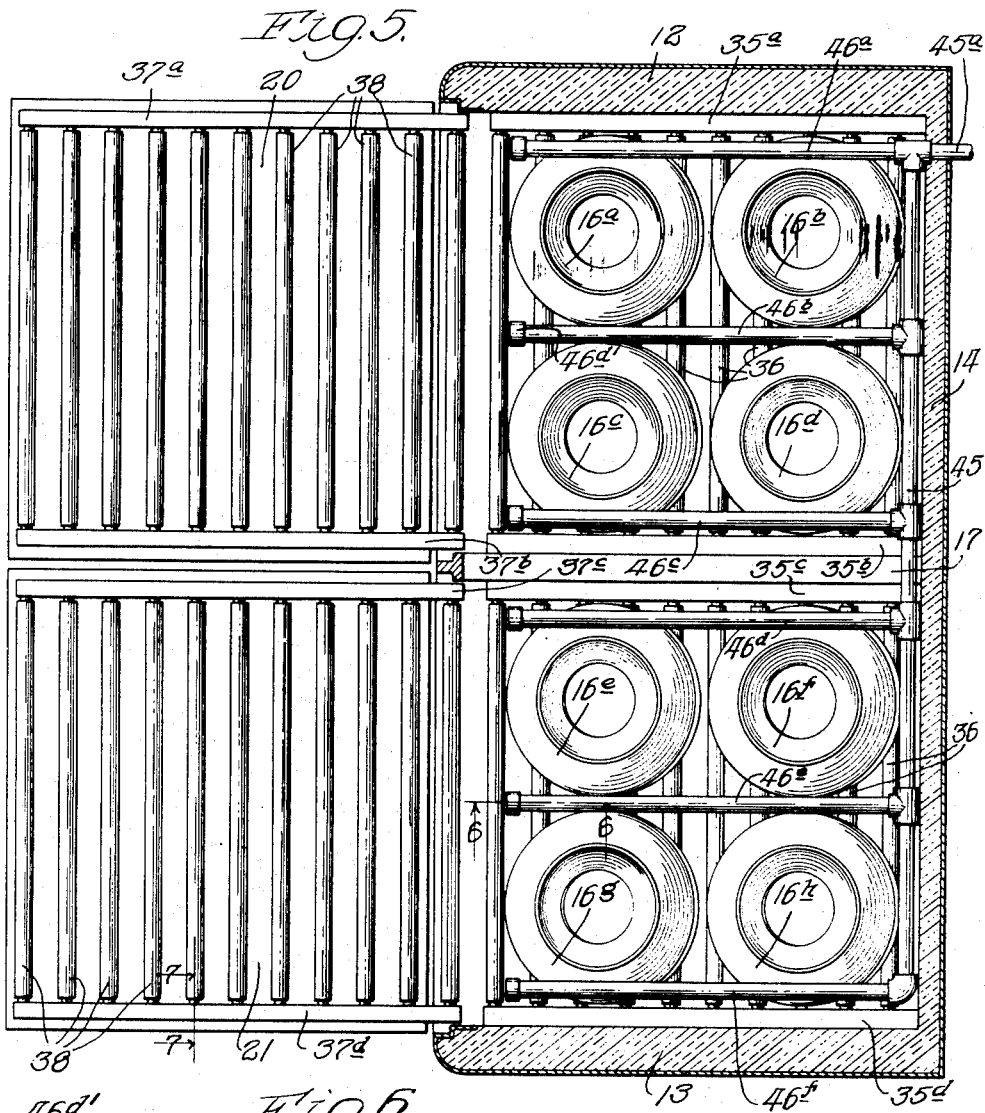
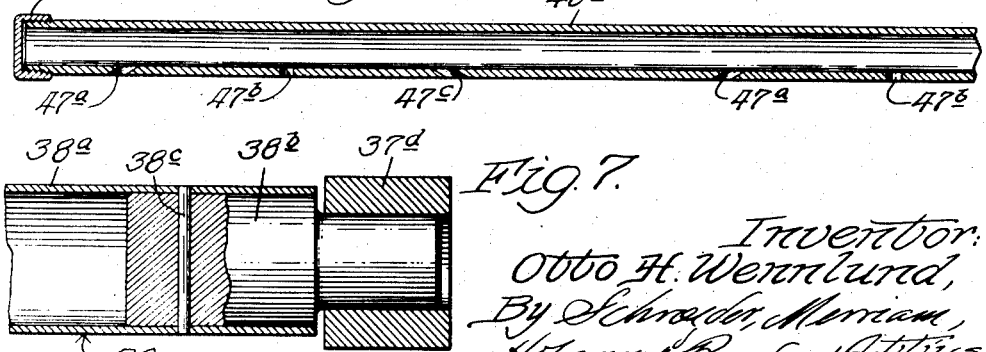
Inventor:
Otto H. Wennlund,
By Schroeder, Merriam,
Hofgren & Brady, Attys.

Patented Sept. 9, 1952

2,610,035

UNITED STATES PATENT OFFICE 2,610,035

MILK COOLER

Otto H. Wennlund, Geneva, Ill.

Application April 15, 1949, Serial No. 87,752

1 Claim. (Cl. 257—189)

This invention relates to a cabinet for cooling milk cans, and more particularly to a cabinet having means for efficiently cooling the milk in said cans.

This application is a division of my application Serial No. 31,341, filed June 5th, 1948 and now abandoned.

One feature of this invention is that it provides an improved cabinet for cooling milk cans; another feature of this invention is that it provides a cabinet having a tank in the bottom for cooling a liquid, and having means for cooling said liquid comprising refrigerant coils having generally straight sections between bends with portions extending substantially from top to bottom of the liquid, said sections extending substantially entirely across the tank and providing an efficient means for cooling all different levels of the liquid; and a further feature of this invention is that it provides means for cooling the upper strata of milk in the cans, this means comprising a plurality of nozzles, the outlets of each nozzle being differently directed to create a flow of cooling liquid uniformly around each can.

Other features and advantages of this invention will be apparent from the following specification and from the drawings in which:

Fig. 1 is a front elevational view of a cabinet constructed in accordance with this invention;

Fig. 2 is a top plan view thereof;

Fig. 3 is a vertical section through the cabinet taken on the line 3—3 of Fig. 1, but with the door shown in solid lines in its open position and in broken lines in its closed position;

Fig. 4 is a horizontal section through the cabinet along the line 4—4 of Fig. 1;

Fig. 5 is a horizontal section through the cabinet along the line 5—5 of Fig. 3 with the door open;

Fig. 6 is an enlarged fragmentary sectional detail view of one of the nozzle pipes taken along the line 6—6 of Fig. 5;

Fig. 7 is an enlarged fragmentary sectional detail view of a portion of one of the supporting rollers and its cooperating bearing member, taken along the line 7—7 of Fig. 5; and Fig. 8 is a fragmentary side elevational view of the portion 43g of the refrigerant coil.

Inasmuch as dairy farms are most often located some distance from the milk processing plant, and are often quite remote from such plant, the dairy farmer has been confronted with the problem of keeping his milk cool between the time of milking and the time the milk is delivered to the plant. Usually the milk is picked up from the farm and delivered to the plant once or twice a day, but since these pick-up routes are necessarily long, it is not possible for each farmer to arrange to have the milk picked up immediately after milking.

In the past, efforts were made to keep the milk cool by providing ordinary water tanks and by pumping water into the tanks from the well on the farm. This system has serious disadvantages, principally because well water is not cold enough, the temperature of such water being usually in the neighborhood of 50° F. Furthermore, the method was expensive, and resulted in much unnecessary labor since the cans must be filled, lifted into the tank, and lifted out of the tank for delivery to the plant.

In recent years efforts have been made to provide cabinets for cooling milk cans, these cabinets having refrigerating units associated therewith. The present invention provides an improved cabinet of this type. It has been found that bacteria increase at a rapid rate in warm milk and that in order to provide a margin of safety in the control of such bacteria the milk should be cooled to a temperature below 50° F. within one hour after milking. If the milk can is placed in a cold water bath the cooling is inefficient, for unless the water surrounding the can is agitated a warm layer or blanket of water soon surrounds the can and insulates the can from the colder water in the bath, and in any event the top milk in the can is usually above the water level.

A cabinet constructed in accordance with the present invention subjects the entire can to a uniformly distributed spray of cold water. In addition the cabinet should be capable of easy cleaning, for if the interior of the cabinet cannot be readily cleaned it soon provides a harbor for bacteria and will undo a dairyman's best efforts to keep the bacteria count of the milk low despite high grade cows and sanitary practice with the rest of the dairy equipment. The interior of the cabinet disclosed here is readily accessible for cleaning.

Finally, since the cans in which milk is stored on dairy farms are of relatively large capacity, generally having a volume of the order of 40 quarts, the cabinet in which the cans are cooled should be designed to facilitate movement of the cans into and out of the cabinet without the necessity of lifting the heavy cans over the walls of the cabinet. Applicant's improved cabinet includes all the above mentioned desirable features as will hereafter appear.

Referring now to the drawings, the cabinet is generally rectangular in horizontal cross section, has a bottom 10, a top 11, end walls 12 and 13, a back wall 14 and a front wall 15 which extends only a short distance above the bottom 10 as shown in Fig. 3.

As illustrated in Figs. 3, 4 and 5, the top, back, front and end walls of the cabinet are of substantial thickness and at least the inner portion of said walls is constructed of insulating material in order to provide for efficient operaton as a cooler. The cabinet illustrated in the drawings is adapted to hold eight milk cans, here designated as 16a—h, said cans extending in two parallel rows longitudinally of the cabinet. Above each milk can position the top 11 is provided with a readily removable cover as shown in Fig. 2 at 11a—h, each of these covers having tapered edges to provide a tight fit in cooperating openings in the top 11, and each of the covers having a central recessed portion in which is mounted a handle shown at 11a'—11h', respectively, to provide an easy means for handling the covers, these handles being flush with the top of the cabinet as shown in Fig. 3.

The cabinet illustrated is divided into two sections by means of a partition 17, and a door is hingedly mounted on the front of each section, these doors being designated as 20 and 21 in Figs. 1, 3 and 5 and being carried by hinges 22a—d on the front wall 15. At the top of each door is a pair of brackets, the brackets on the door 20 being designated as 25 and the brackets on the door 21 being designated as 26. Each bracket carries a latch, as the latch 26a shown in Fig. 3, these latches respectively cooperating with one of the latch plates 27 and 28 carried along the front edge of the top 11. The latches are operated by levers 30 on the door 20 and by levers 31 on the door 21, these levers being pivotally mounted on the respective brackets 25 and 26 and being operatively connected to the latches so that each latch extends out from its respective bracket 25 and 26 and cooperates with the latch plates when the respective levers 30—31 extend parallel to the plane of the door as shown in broken lines in Fig. 3, while each latch moves into the respective bracket 25—26 in order to allow the door to be opened when the respective levers 30—31 are swung to a position at right angles to the plane of the door as shown in full lines in Fig. 3. A handle bar 32 extends between the levers 30 and a handle bar 33 extends between the levers 31 to provide means for opening the doors, and as illustrated in Fig. 3 the levers 30—31 form supports or legs to support the respective doors in substantially horizontal position when the doors are opened.

Within the cabinet are a plurality of bearing blocks 35a—d, these bearing blocks extending generally parallel to each other, and each being at the same height above the floor of the cabinet, and preferably being readily removably mounted within the cabinet. The bearing blocks 35a and 35b, respectively mounted on the end wall 12 and the partition 17 comprise one pair of bearing members, and the blocks 35c and 35d respectively mounted on the other side of the partition 17 and on the end wall 13 comprise another pair of bearing members. A plurality of rollers 36 are carried between each pair of bearing members, the ends of the rollers being journalled in the bearing blocks and the rollers forming a support adapted to have the cans rest thereon. The bearing blocks 35 preferably do not extend parallel to the floor of the cabinet, but lie in a plane sloping slightly toward the door of the cabinet, preferably having a slope of about one-half inch to two feet horizontal distance, this slope being illustrated in exaggerated form in Fig. 3.

The door 20 has a pair of bearing blocks 37a and 37b mounted thereon along the edges thereof, and the door 21 has another pair of bearing blocks 37c and 37d mounted along the edges thereof, a plurality of rollers 38 being carried between each pair of bearing blocks, the ends of each roller being journalled in openings in the blocks. As seen in Fig. 3 the upper surface of the rollers 38 on the doors are in the same horizontal plane as the upper surface of the front rollers 36 within the cabinet to form a continuous support adapted to extend outside of the cabinet when the doors are open.

The rollers 36 and 38 and the bearing blocks 35 and 37 are of a novel construction illustrated in Fig. 7. Each roller comprises a galvanized pipe 38a preferably having an outside diameter of about 1¾ inches and an inside diameter of about 1¼ inches. A hard maple insert 38b extends from each end of the pipe 38a, being held in place in the end of the pipe by means of a pin 38c. The bearing blocks 35 and 37 preferably are formed of wood, as for example of hickory, and the bearing blocks and the inserts 36b are both boiled in a lubricant, as oil containing graphite, before the cabinet is assembled. This construction provides a self-lubricating bearing which is suitable for use while in contact with water. Of course, the wood will not corrode, and the oil-graphite treatment provides a means of self-lubrication for the bearing.

In the bottom of the cabinet below the supporting rollers 36 is a tank 40, this tank being adapted to contain a cooling liquid as water. Means for cooling the liquid are provided, this means comprising refrigerant coils having generally straight sections between bends extending substantially from top to bottom of the liquid in the tank. Figs. 3, 4 and 8 illustrate these coils, there being an inlet portion 41 protected from damage by the milk cans by a bumper 14a projecting from the back wall 14; an outlet portion 42; and a coil portion comprising a plurality of generally straight segments 43a—g interconnected by a plurality of curved portions 44a—f. As shown in Fig. 4 each segment extends substantially entirely across the tank longitudinally thereof, and as shown in Fig. 8 each segment comprises a plurality of generally straight sections between bends and each section extending substantially from top to bottom of the liquid. In Fig. 8 a portion of the segment 43g is illustrated, this segment comprising a plurality of sections between bends 43g' adjacent the bottom of the liquid in the tank and bends 43g'' adjacent the top of the liquid in the tank. This construction insures that all levels of the liquid will be cooled in an equal degree so that the top of the liquid does not become warm. I prefer the construction illustrated in Figs. 3, 4 and 8 to a helix or other form, since in my improved construction adjacent sections of the coil extend through all strata of the liquid. As is commonly known, under certain conditions of use the refrigerant in a coil may evaporate only in a certain portion of the coil, as for example in the first half of the coil. Under these conditions all levels of liquid in the tank are still equally cooled with the construction illustrated, and the user is assured that the unit will operate efficiently whether it is overloaded or whether it is operating under a very light load.

The refrigerant coil just described may be connected to a conventional condensing unit, this unit not being illustrated or described here, reference being had to certain issued patents, as for example the patent to Hiller, No. 2,181,553, issued November 28, 1939; the patent to McMahon, No. 2,411,833, dated November 26, 1946; or the patent to Gates, No. 2,337,323, dated December 21, 1943, to complete the disclosure in this regard.

The cooled water from the tank 40 is pumped into a pipe 45 through an inlet 45a leading from a conventional pump not shown, but which is fed from the tank 40 and which may be similar to the apparatus described in the Gates patent above mentioned, in the patent to Chamberlain, No. 2,256,971, dated September 23, 1941, or in the patent to Hirsch, No. 2,140,744, dated December 20, 1938. Pipe 45 extends substantially entirely across the back of the cabinet near the top thereof, and a plurality of nozzle pipes extend transversely from the pipe 45 and terminate adjacent the front of the cabinet. In the apparatus illustrated there are six of these nozzle pipes designated as 46a—f. As shown in Fig. 5 the nozzle pipes 46 extend between the can positions within the cabinet so that the pipes are on opposite sides of each can and a spray may be directed on the neck of each can. The construction of the nozzles is shown fragmentarily in Fig. 6. Each nozzle preferably comprises a straight ¾ inch pipe closed at the end by a cap as the cap 46d'. The pipe has a plurality of sets of outlets, each set having a plurality of differently directed openings, these openings being designated as 47a, b and c in Fig. 6. The openings 47a preferably are directed forwardly of the pipe at an angle of about 30 degrees to the longitudinal axis of the pipe; the openings 47b are directed transversely to the longitudinal axis of the pipe; and the openings 47c are directed rearwardly of the pipe preferably at an angle of about 30 degrees to the longitudinal axis thereof. With this construction each nozzle pipe distributes cooling liquid quite uniformly about one-half of the neck of each milk can, and since the nozzle pipes are arranged on opposite sides of the cans a flow of cooling water is distributed uniformly around each can.

In operation the apparatus illustrated and described provides many advantages over other milk cooling arrangements. When it is desired to load the cabinet the doors are opened to provide a support at the same level as the supporting floor of the cabinet. Empty milk cans are placed on rollers 38 which are carried by the doors and are rolled into the cabinet, a can being placed in each can position if desired. When the doors are closed the cans are within a well insulated refrigerating unit. When it is desired to fill a can one of the lids, as the lid 11e, is removed and the can is filled through the top of the cabinet, preferably through a strainer. Assuming that the refrigerating apparatus is in operation, a plurality of streams of cold water are directed from the nozzles uniformly around the neck of each can so that the milk within the can is in each case refrigerated uniformly. Since the water is moving, cold water is always in contact with the cans, and since the spray is directed onto the cans at or above the surface of milk in the cans the top milk in the cans is cooled as well as the bottom milk. The cold water in the tank 40 and the cold water from the nozzles cools the air in the cabinet, providing an efficient refrigerating chamber. When it is desired to remove the milk for delivery to the plant, one or both of the doors are opened and the cans are rolled out onto the platform provided by the doors, from which they may be removed to a dolly or other transporting device. It will be seen that it is not necessary to lift the heavy cans at any stage of the operation, and the cooling is carried on in an efficient manner. Furthermore, the slight slope of the rollers 36 facilitates removal of the heavy cans from the cabinet. An additional advantage is provided since the spaced rollers permit free circulation of cold air underneath the recessed bottom of the cans. If the cans rested upon a solid floor a blanket of warm air would be trapped underneath each can.

The novel construction of the refrigerant coil insures efficient cooling of all levels of the water or other cooling liquid in the tank, and the novel construction of the spray nozzle insures that streams of cold water will be delivered uniformly over the entire surface of the walls of the cans.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

In a cabinet for cooling milk cans and having a tank in the bottom thereof for a cooling liquid and a plurality of can-supporting rollers, means for cooling a can comprising a pair of pipes extending horizontally adjacent the neck of said can on opposite sides thereof, said pipes each having a plurality of outlets directed horizontally but at slightly different angles from said pipe and toward said can for spraying cooling liquid uniformly over a substantial area of the surface of said can.

OTTO H. WENNLUND.

REFERENCES CITED

The following references are of record in the file of this patent:

UNITED STATES PATENTS

| Number | Name | Date |
|---|---|---|
| Re. 22,917 | Chamberlain | Sept. 23, 1947 |
| 729,425 | Schuler | May 26, 1903 |
| 1,730,248 | Schaffer | Oct. 1, 1929 |
| 1,896,202 | Richardson | Feb. 7, 1933 |
| 2,039,235 | Markley | Apr. 28, 1936 |
| 2,140,895 | Bruce | Dec. 20, 1938 |
| 2,323,308 | Chamberlain | July 6, 1943 |
| 2,425,519 | Duncan | Aug. 12, 1947 |
| 2,455,162 | Donnelly | Nov. 30, 1948 |
| 2,482,579 | Duncan | Sept. 20, 1949 |

FOREIGN PATENTS

| Number | Country | Date |
|---|---|---|
| 586,255 | Great Britain | Mar. 12, 1947 |